(12) United States Patent
Kanda (10) Patent No.: US 6,389,342 B1
(45) Date of Patent: May 14, 2002

(54) STEERING APPARATUS FOR VEHICLE (75) Inventor: Koji Kanda, Kyoto (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/545,666

(22) Filed: Apr. 7, 2000

(30) Foreign Application Priority Data

Apr. 14, 1999 (JP) .......................................... 11-107240

(51) Int. Cl.$^7$ ................................................ B62D 6/00
(52) U.S. Cl. ............................. 701/41; 701/43; 701/62; 180/141; 180/443; 475/286; 475/225; 318/432; 318/439
(58) Field of Search .............................. 701/41, 42, 43; 180/402, 403, 443, 445, 446, 233, 421, 422, 444, 404; 475/204, 231; 318/638

(56) References Cited

U.S. PATENT DOCUMENTS

| | | | | |
|---|---|---|---|---|
| 6,082,482 A | * | 7/2000 | Kato et al. | 180/402 |
| 6,116,372 A | * | 9/2000 | Mukai et al. | 180/446 |
| 6,144,909 A | * | 11/2000 | Sakamaki et al. | 701/41 |
| 6,148,951 A | * | 11/2000 | Nishi et al. | 180/446 |
| 6,154,696 A | * | 11/2000 | Nishi et al. | 701/41 |
| 6,184,637 B1 | * | 2/2001 | Yamawaki et al. | 318/432 |

FOREIGN PATENT DOCUMENTS

| | | |
|---|---|---|
| JP | 2-29017 | 8/1990 |
| JP | 10-203393 | 8/1998 |

* cited by examiner

Primary Examiner—William A. Cuchlinski, Jr.
Assistant Examiner—Tuan C To
(74) Attorney, Agent, or Firm—Darby & Darby (57) ABSTRACT The invention provides a linkless steering apparatus for vehicle in which a steering mechanism and steering wheel are not mechanically connected. The steering apparatus drives a steering motor of the steering mechanism in accordance with a steering torque so as to increase or decrease a steering angle. The steering torque for this purpose is calculated based on results obtained by detecting a rotational angle of an electric motor (a reaction-force motor) connected to a rotational shaft of the steering wheel and an electric current flowing to the electric motor, a moment of inertia of the steering wheel, and a moment of inertia of the electric motor. Therefore, it is possible to avoid use of a torque sensor which requires a large space for installation thereof and high cost.

16 Claims, 3 Drawing Sheets

STEERING APPARATUS FOR VEHICLE

BACKGROUND OF THE INVENTION

The present invention relates to a steering apparatus for a vehicle in which a steering mechanism for changing a direction of tire wheels is not mechanically connected to a steering wheel, a steering torque applied to the steering wheel is obtained and an electric motor included in the steering mechanism is driven and controlled in accordance with the calculated steering torque, thereby increasing or decreasing a steering angle.

A steering operation of a vehicle is performed by operating a steering device arranged within passengers' room, for example, by transmitting a rotation of the steering wheel to the steering mechanism which is arranged outside the passengers' room for directing tire wheels (generally front tire wheels).

In recent years, there has been widely spread a steering apparatus (a power steering apparatus) for vehicle structured such as to arrange an actuator for steering assistance such as a hydraulic cylinder, an electric motor or the like in the middle of the steering mechanism, drives the actuator based on a detected result of operating force applied to the steering wheel to assist an operation of the steering mechanism in accordance with the rotation of the steering wheel, thereby reducing labor and load of a driver for steering.

However, in the conventional steering apparatus mentioned above, a mechanical connection (linkage) between the steering wheel corresponding to the steering device and steering mechanism is required, so that there is a problem that an arranging position of the steering wheel within the passengers' room is limited to a position at which the connection with the steering mechanism outside of the passengers' room can be achieved, and further, even in the case that the steering wheel is arranged at connectable position, a complex connecting structure is required for realizing the connection, so that this becomes a reason of interrupting the vehicle from being reduced in weight and its assembling process from being simplified.

For example, in Japanese Utility Model Publication No. 2-29017, there is disclosed a steering apparatus such as a linkless (drive-by-wire) power steering apparatus which is aimed to solve the problem mentioned above. In this steering apparatus, the steering wheel is mechanically separated from the steering mechanism and an electric motor such as an actuator for steering is arranged in the middle of the steering mechanism in the same manner as that of the actuator for steering assistance in the conventional steering apparatus. The structure is made such that the steering operation is performed in accordance with the operation of the steering wheel by driving the electric motor based on a detected result of operating direction and operating amount of the steering wheel.

The linkless steering apparatus structured in the manner mentioned above has advantages for automobile technology development future such as realizing a new steering device such as a lever (a joy stick), a pedal in place of the steering wheel, realizing an autopilot system in accordance with a route information obtained by detecting guide signs on a road surface and by receiving a satellite information, in addition to the scopes mentioned above such as increasing freedom of arrangement of the steering wheel and reducing weight of the vehicle.

In the above-mentioned steering apparatus, a torque sensor using a torsion bar is considered as its conventional detecting system of the steering torque, however, the system has problems that the torque sensor using the torsion bar is high in cost and that a freedom of design is limited because of size and placing position thereof are limited.

BRIEF SUMMARY OF THE INVENTION

The present invention is made by solving the problems mentioned above, and an object of the present invention is to provide a linkless steering apparatus for a vehicle which does not require a torque sensor for detecting a steering torque which occupies a large space and is high in cost.

In accordance with a first aspect of the present invention, there is provided a steering apparatus, in which a steering mechanism for changing a direction (a steering angle) of a tire wheel is not mechanically connected to a steering wheel, a steering torque applied to the steering wheel is obtained and an actuator included in the steering mechanism is driven and controlled in accordance with the obtained steering torque, thereby increasing or decreasing steering angle, characterized by comprising: an electric motor connected to a rotational shaft of the steering wheel; a steering angle detector for detecting a steering angle of the steering wheel; and a calculator for calculating the steering torque based on the steering angle detected by the steering angle detector, a moment of inertia of the steering wheel, and a moment of inertia of the electric motor.

In this invention, the steering mechanism for changing a direction of the tire wheel is not mechanically connected to the steering wheel, the steering torque applied to the steering wheel is obtained, and the actuator included in the steering mechanism is driven and controlled in accordance with the obtained steering torque, whereby the steering angle is controlled so as to be increased or decreased. The electric motor is connected to the rotational shaft of the steering wheel and the steering angle detector detects the steering angle of the steering wheel. The calculator calculates the steering torque based on the steering angle detected by the steering angle detector, the moment of inertia of the steering wheel, and the moment of inertia of the electric motor.

Therefore, it is possible to realize a linkless steering apparatus which does not need a torque sensor that occupies large space and is high-cost.

In accordance with a modification of the first aspect, there is provided a steering apparatus, further comprising a current detector for detecting an electric current flowing through the electric motor, wherein the calculator calculates the steering torque based on the electric current detected by the current detector, the steering angle of the steering wheel, the moment of inertia of the steering wheel, and the moment of inertia of the electric motor.

In this invention, the current detector detects the current which flows through the electric motor. The calculator calculates the steering torque based on the electric current detected by the current detector, the steering angle detected by the steering angle detector, the moment of inertia of the steering wheel, and the moment of inertia of the electric motor. That is, for example, even when the electric motor is operated as a reaction-force motor in the invention mentioned above, the calculator determines a reaction force which the electric motor actually generates based on the electric current detected by the current detector and calculates the steering angle by considering the reaction force.

Therefore, it is possible to realize a linkless steering apparatus which does not need a torque sensor that occupies large space and is high-cost, even in the case that the electric motor generates the reaction force.

More particularly, in the calculation of the steering torque in the former invention, the calculator calculates a steering angular acceleration based on the steering angle, adds the moment of inertia of the steering wheel and the moment of inertia of the electric motor, multiplies by the steering angular acceleration by the added result, and calculates the steering torque based on the multiplied result.

Further, in the calculation of the steering torque in the latter invention, the electric current flowing through the electric motor is detected by the current detector, and the calculator calculates the steering angular acceleration based on the steering angle, adds the moment of inertia of the steering wheel and the moment of inertia of the electric motor, multiplies the steering angular acceleration by the added result, further, adds the multiplied result and the value based on the electric current and calculates the steering torque based on the added result.

In accordance with a second aspect of the present invention, there is provided a steering apparatus, in which a steering mechanism for changing a direction (a steering angle) of a tire wheel is not mechanically connected to a steering wheel, a steering torque applied to the steering wheel is obtained and an actuator included in the steering mechanism is driven and controlled in accordance with the obtained steering torque, thereby increasing or decreasing a steering angle, characterized by comprising: an electric motor connected to a rotational shaft of the steering wheel; a rotational angle detector for detecting a rotational angle of the electric motor; and a calculator for calculating the steering torque based on the rotational angle detected by the rotational angle detector, a moment of inertia of the steering wheel, and a moment of inertia of the electric motor.

In this invention, the steering mechanism for changing a direction of the tire wheel is not mechanically connected to the steering wheel, the steering torque applied to the steering wheel is obtained, and the actuator included in the steering mechanism is driven and controlled, whereby the steering angle is controlled so as to be increased and decreased The electric motor is connected to the rotational shaft of the steering wheel and the rotational angle detector detects the rotational angle of the electric motor. The calculator calculates the steering torque based on the rotational angle detected by the rotational angle detector, the moment of inertia of the steering wheel, and the moment of inertia of the electric motor. That is, with respect to the steering apparatus in accordance with the first aspect mentioned above, the detecting system for the steering angle is not required, and the rotational angle of the electric motor which has a relationship with the steering angle is detected and used in place of the steering angle.

Therefore, it is possible to realize a linkless steering apparatus which does not need a torque sensor that occupies large space and is high-cost.

In accordance with a modification of the second aspect, there is provided a steering apparatus, further comprising an current detector for detecting an electric current flowing through the electric motor, wherein the calculator calculates the steering torque based on the electric current detected by the current detector, the rotational angle of the electric motor, the moment of inertia of the steering wheel, and the moment of inertia of the electric motor.

In this invention, the current detector detects the current which flows through the electric motor. The calculator calculates the steering torque based on the electric current detected by the current detector, the rotational angle detected by the rotational angle detector, the moment of inertia of the steering wheel, and the moment of inertia of the electric motor. That is, for example, even when the electric motor is operated as a reaction-force motor in the invention mentioned above, the calculator determines a reaction force which the electric motor actually generates based on the electric current detected by the current detector and calculates the steering angle by considering the reaction force.

Therefore, it is possible to realize a linkless steering apparatus which does not need a torque sensor that occupies large space and is high-cost, even in the case that the electric motor generates the reaction force.

More particularly, in the calculation of the steering torque in the former invention, the calculator calculates a rotational angular acceleration based on the rotational angle of the electric motor, adds the moment of inertia of the steering wheel and the moment of inertia of the electric motor, multiplies the rotational angular acceleration by the added result, and calculates the steering torque based on the multiplied result Further, in the calculation of the steering torque in the latter invention, the electric current flowing through the electric motor is detected by the current detector, and the calculator calculates the rotational angular acceleration based on the rotational angle of the electric motor, adds the moment of inertia of the steering wheel and the moment of inertia of the electric motor, multiplies the steering angular acceleration by the added result, further, adds the multiplied result and the value based on the electric current, and calculates the steering torque based on the added result.

In accordance with a third aspect of the present invention, there is provided a steering apparatus, in which a steering mechanism for changing a direction (a steering angle) of a tire wheel is not mechanically connected to a steering wheel, a steering torque applied to the steering wheel is obtained and an actuator included in the steering mechanism is driven and controlled in accordance with the obtained steering torque, thereby increasing or decreasing a steering angle, characterized by comprising: an electric motor connected to a rotational shaft of the steering wheel; a counter voltage detector for detecting a counter voltage of the electric motor; and a calculator for calculating the steering torque based on the counter voltage detected by the counter voltage detector, a moment of inertia of the steering wheel, and a moment of inertia of the electric motor.

In this invention, the steering mechanism for changing a direction of the tire wheel is not mechanically connected to the steering wheel, the steering torque applied to the steering wheel is obtained, and the actuator included in the steering mechanism is driven and controlled, whereby the steering angle is controlled so as to be increased and decreased. The electric motor is connected to the rotational shaft of the steering wheel and the counter voltage detector detects the counter voltage of the electric motor. The calculator calculates the steering torque based on the counter voltage detected by the counter voltage detector, the moment of inertia of the steering wheel, and the moment of inertia of the electric motor. That is, with respect to the steering apparatus in accordance with the first and second aspects mentioned above, the detecting systems for the steering angle and the rotational angle of the electric motor are not required, and the counter voltage of the electric motor which has a relationship with the steering angle and the rotational angle is detected and used in place of the steering angle.

Therefore, it is possible to realize a linkless steering apparatus which does not need a torque sensor that occupies large space and is high-cost.

More particularly, in the calculation of the steering torque in the present invention, the calculator adds the moment of inertia of the steering wheel and the moment of inertia of the electric motor, multiplies the counter voltage by the added result, and calculates the steering torque based on the multiplied result.

Further, as is described later, in the case of actively using the electric motor as a reaction-force motor which applies a force (a reaction force) in a direction opposite to the operating direction of the steering wheel, it is actually impossible to detect the counter voltage. However, in the case of passively using the electric motor as a detecting system for the counter voltage not as the reaction force motor, the above definition is not employed.

Further, in accordance with the other modification.of the present invention, there is provided a steering apparatus as recited in the first and second aspect mentioned above, wherein the electric motor is a reaction-force motor which applies a force to the steering wheel in a direction opposite to an operating direction of the steering wheel.

In this invention, the electric motor connected to the rotational shaft of the steering wheel is the reaction-force motor which applies the force (the reaction force) to the steering wheel in the direction.opposite to the operating direction of the steering wheel.

Therefore, it is possible to employs the existing reaction-force motor as for the purpose of giving the same steering feeling as that of the linked steering apparatus to the driver in the linkless steering apparatus, as the electric motor In this case, as mentioned above, in the steering apparatus in accordance with the third aspect, the electric motor can not be replaced by the reaction-force motor, however, another electric motor can be further provided in addition to the reaction-force motor.

The above and further objects and features of the invention will more fully be apparent from the following detailed description with accompanying drawings.

DETAILED DESCRIPTION OF THE INVENTION

A description will be in detail given below of an embodiment in accordance with the present invention with reference to the accompanying drawings.

Figure 1A:
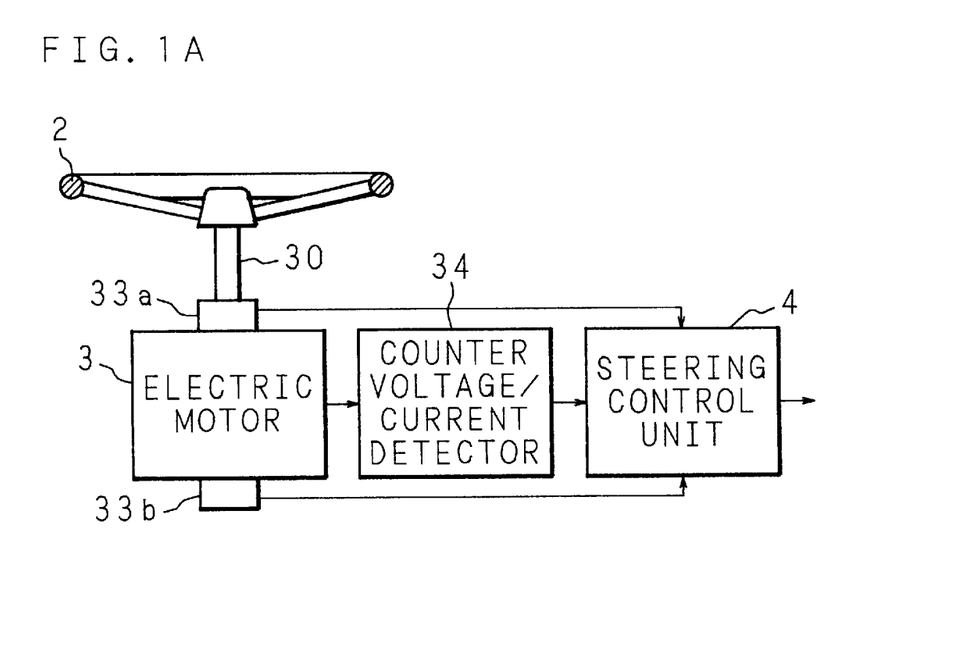
FIG. 1A is a schematic view showing a principle configuration of a steering apparatus for vehicle according to the present invention.

FIG. 1A is a schematic view showing a principle configuration of a steering apparatus according to the present invention. The steering apparatus is generally provided with an electric motor (a reaction-force motor) 3 connected to a rotational shaft 30 of a steering wheel 2 for exerting a force (a reaction force) onto the steering wheel 2 in a direction opposite to that of operation of the steering wheel 2, a rotary encoder 33a for detecting a steering angle of the steering wheel 2, a rotary encoder 33b for detecting a rotational angle of the electric motor 3, and a counter-voltage/current detector 34 for detecting a counter voltage of the electric motor 3 and a current flowing through the electric motor 3.

Further, the steering apparatus is provided with a steering control unit 4 for calculating/detecting a steering torque applied to the steering wheel 2 based on any one of a steering angle detected by the rotary encoder 33a, a rotational angle detected by the rotary encoder 33b, or a counter voltage detected by the counter-voltage/current detector 34, and a moment of inertia of the steering wheel 2 and a moment of inertia of the electric motor 3.

The steering control unit 4 is also made to be able to calculate/detect the steering torque applied to the steering wheel 2 based on either one of the steering angle detected by the rotary encoder 33a or the rotational angle detected by the rotary encoder 33b, and a current detected by the counter-voltage/current detector 34, the moment of inertia of the steering wheel 2, and the moment of inertia of the electric motor 3.

The steering control unit 4 controls a reaction force which is applied to the steering wheel 2 by using the electric motor 3 in a direction opposite to that of operation of the steering wheel 2, based on the calculated/detected steering torque.

Figure 1B:
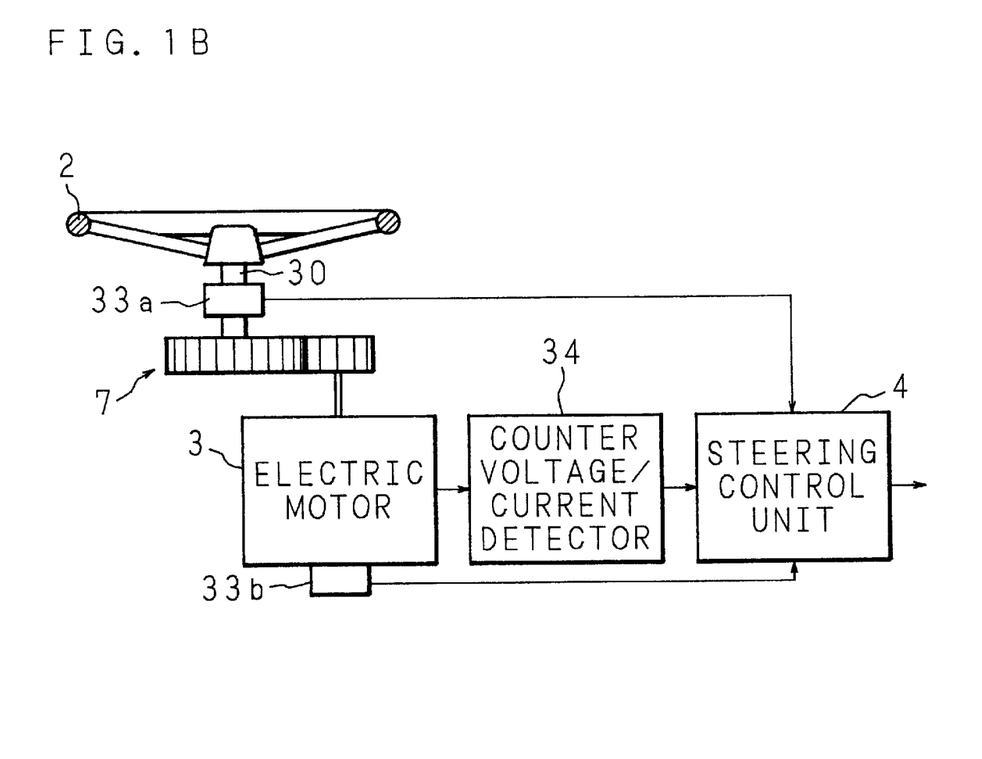
FIG. 1B is a schematic view showing a principle configuration that a speed increasing gear for increasing a rotational speed of an electric motor is provided between a steering wheel and reaction-force motor in the steering apparatus having the principle configuration shown in FIG. 1A.

FIG. 1B is a schematic view showing a principle configuration that a speed increasing gear for increasing a rotational speed of the electric motor 3 is provided between the rotary encoder 33a in a side of the steering wheel 2 and the electric motor 3 in the steering apparatus having the principle configuration shown in FIG. 1A.

A description will be given below of a principle of a control system of the steering apparatus having these two configurations.

First, since the configuration having the control system shown in FIG. 1A does not have the speed increasing gear 7, it can be considered that a steering angle $\theta_h$ of the steering wheel 2 being detected by the rotary encoder 33a is equal to a rotational angle $\theta_m$ of the electric motor 3 being detected by the rotary encoder 33b, thereby the relationship thereof can be represented by the following equation (1):

$$\theta_m = \theta_h \quad (1)$$

Further, when defining the torque applied from the steering wheel 2 to the electric motor 3 as $T_x$ and the torque applied from the electric motor 3 to the steering wheel 2 as $T_y$, the relationship thereof can be represented by the following equation (2).

$$T_x = T_y \quad (2)$$

Here, T is a torque (steering torque) actually applied to the steering wheel 2, $T_m$ is a torque actually generated by the electric motor 3, $I_h$(a fixed value) is a predetermined moment of inertia of the steering wheel 2, $I_m$(a fixed value) is a predetermined moment of inertia of the electric motor 3, $C_h$ (a fixed value) is a predetermined coefficient of viscosity resistance between the steering wheel 2 and the speed increasing gear 7, and $C_m$(a fixed value) is a predetermined coefficient of viscosity resistance between the speed increasing gear 7 and the electric motor 3, a relationship between the values $T_x$ and $T_y$ mentioned above can be represented by the following equations (3) and (4).

$$T_x = T - I_h \cdot \theta_h'' - C_h \cdot \theta_h' \quad (3)$$

$$T_y = T_m + I_m \cdot \theta_m'' + C_m \cdot \theta_m' \quad (4)$$

Here, $\theta' = d\theta/dt$; $\theta'' = d^2\theta/dt^2$.

By substituting the equations (3) and (4) into the equation (2), the following equation can be obtained:

$$T - I_h \cdot \theta_h'' - C_h \theta_h' = T_m + I_m \cdot \theta_m'' + C_m \cdot \theta_m'$$

That is, $$T = T_m + I_m \cdot \theta_m'' + C_m \cdot \theta_m' + I_h \cdot \theta_h'' + C_h \cdot \theta_h' \quad (5)$$

From the equation (1), the equation (5) can be represented by the following equations (6a) and (6b):

$$T = T_m + I_m \cdot \theta_h'' + C_m \cdot \theta_h' + I_h \cdot \theta_h'' + C_h \cdot \theta_h' = T_m + (I_m + I_h)\theta_h'' + (C_m + C_h)\theta_h' \quad (6a)$$

$$T = T_m + I_m \cdot \theta_m'' + C_m \cdot \theta_m' + I_h \cdot \theta_m'' + C_h \cdot \theta_m' = T_m + (I_m + I_h)\theta_m'' + (C_m + C_h)\theta_m' \quad (6b)$$

Therefore, from the equations (6a) and (6b), it is possible to obtain the steering torque T only by detecting either one of the steering angle $\theta_h$ of the steering wheel 2 or the rotational angle $\theta_m$ of the electric motor 3, as long as the electric motor 3 is not used as the reaction-force motor, that is, $T_m = 0$.

Thus, $$T = (I_m + I_h)\theta_h'' + (C_m + C_h)\theta_h' \quad (7a)$$

$$T = (I_m + I_h)\theta_m'' + (C_m + C_h)\theta_m' \quad (7b)$$

Here, $K_e$ is a coefficient of counter voltage of the electric motor 3, a counter voltage V of the electric motor 3 an be represented by the following equation:

$$V = K_e \cdot \theta_m'$$

That is, $$\theta_m' = V/K_e = \theta_h' \quad (8a)$$

$$\therefore \theta_m'' = V'/K_e = \theta_h'' \quad (8b)$$

Here, $V' = dV/dt$.

Thus, from the equations (8a) and (8b), the equations (7a) and (7b) are represented as follows:

$$T = (I_m + I_h)V'/K_e + (C_m + C_h)V/K_e \quad (9)$$

Therefore, from the equation (9), it is possible to obtain the steering torque T only by detecting the counter voltage V of the electric motor 3 as long as the electric motor 3 is not used as the reaction-force motor.

On the contrary, in the case that the electric motor 3 is used as the reaction-force motor, that is, $T_m \neq 0$, since it is evidently impossible to detect the counter voltage V, the steering torque T is obtained from an electric current i flowing to the electric motor 3 instead.

Here, $K_t$ is a coefficient of torque of the electric motor 3, a torque $T_m$ actually generated by the electric motor 3 can be given by the following equation (10):

$$T_m = i \cdot K_t \quad (10)$$

Thus, the following equations (11a) and (11b) can be obtained by substituting the equation (10) into the equations (6a) and (6b):

$$T = i \cdot K_t + (I_m + I_h)\theta_h'' + (C_m + C_h)\theta_h' \quad (11a)$$

$$T = i \cdot K_t + (I_m + I_h)\theta_m'' + (C_m + C_h)\theta_m' \quad (11b)$$

Therefore, even in the case that the electric motor 3 is used as the reaction-force motor, it is possible to obtain the steering torque T based on either one of the steering angle $\theta_h$ of the steering wheel 2 or the rotational angle $\theta_m$ of the electric motor 3, and the electric current i flowing to the electric motor 3.

Here, $$\omega_h = \theta_h'; \quad \omega_h' = d\omega_h/dt = \theta_h''$$

$$\omega_m = \theta_m'; \quad \omega_m' = d\omega_m/dt = \theta_m''$$

The equations (11a) and (11b) can be represented by the following equations (12a) and (12b):

$$T = i \cdot K_t + (I_m + I_h)\omega_h' + (C_m + C_h)\omega_h \quad (12a)$$

$$T = i \cdot K_t + (I_m + I_h)\omega_m' + (C_m + C_h)\omega_m \quad (12b)$$

Next, in the case of having the control system of FIG. 1B, since the system has the speed increasing gear 7, when a gear ratio of the speed increasing gear 7 is n:1, the steering angle $\theta_h$ of the steering wheel 2 detected by the rotary encoder 33a and the rotational angle $\theta_m$ of the electric motor 3 detected by the rotary encoder 33b can be given by the following equation (13):

$$\theta_m = n \cdot \theta_h \quad (13)$$

Further, here, $T_x$ is a torque applied from the steering wheel 2 onto the electric motor 3, that is, the torque applied to a gear in the side of the steering wheel 2 of the speed increasing gear 7, and $T_y$ is a torque applied from the electric motor 3 onto the steering wheel 2, that is, a torque applied to the gear in the side of the electric motor 3 of the speed increasing gear 7, the relationship between $T_x$ and $T_y$ is given by the following equation (14):

$$T_x = n \cdot T_y \quad (14)$$

Here, T is a torque (the steering torque) actually applied to the steering wheel 2, $T_m$ is a torque actually generated by the electric motor 3, $I_h$ (a fixed value) is a predetermined moment of inertia of the steering wheel 2, $I_m$ (a fixed value) is a predetermined moment of inertia of the electric motor 3, $C_h$ (a fixed value) is a predetermined coefficient of viscosity resistance between the steering wheel 2 and speed increasing gear 7, and $C_m$ (a fixed value) is a predetermined coefficient of viscosity resistance between the speed increasing gear 7 and electric motor 3, the relationship between $T_x$ and $T_y$ can be represented by the following equations (3) and (4):

$$T_x = T - I_h \cdot \theta_h'' - C_h \cdot \theta_h' \quad (3)$$

$$T_y = T_m + I_m \cdot \theta_m'' + C_m \cdot \theta_m' \quad (4)$$

Here, $\theta' = d\theta/dt$; $\theta'' = d^2\theta/dt^2$.

Substituting the equations (3) and (4) into the equation (14), $$T - I_h \cdot \theta_h'' - C_h \cdot \theta_h' = n(T_m + I_m \cdot \theta_m'' + C_m \cdot \theta_m') = nT_m + nI_m \cdot \theta_m'' + nC_m \cdot \theta_m'$$

That is, $$T = nT_m + nI_m \cdot \theta_m'' + nC_m \cdot \theta_m' + I_h \cdot \theta_h'' + C_h \cdot \theta_h' \quad (15)$$

From the equation (13), the equation (15) can be represented by the following equation (16a) or (16b):

$T = nT_m + nI_m \cdot (n\theta_h'') + nC_m \cdot (n\theta_h') + I_h$ $\cdot \theta_h'' + C_h \cdot \theta_h'$ $= nT_m + n^2 I_m \cdot \theta_h'' + n^2 C_m \cdot \theta_h' + I_h \cdot \theta_h''$ $+ C_h \cdot \theta_h'$ $= nT_m + (n^2 I_m + I_h)\theta_h'' + (n^2 C_m + C_h)\theta_h'$ (16a)

$T = nT_m + I_m \cdot \theta_m'' + nC_m \cdot \theta_m' + I_h \cdot (\theta_m''/n) + C$ $h \cdot (\theta_m'/n) =$ $nT_m + nI_m \cdot \theta_m'' n C_m \cdot \theta_m' + n^{-1} I_h \cdot \theta_m'' +$ $n^{-1} C_h \cdot \theta_m'$ $= nT_m + (n^2 I_m + I_h)\theta_m''/n + (n^2 C_m + C_h)\theta_m$ $'/n$ (16b)

Therefore, from the equations (16a) and (16b), it is possible to obtain the steering torque T only by detecting either one of the steering angle $\theta_h$ of the steering wheel 2 or the rotational angle $\theta_m$ of the electric motor 3, as long as the electric motor 3 is not used as the reaction-force motor, that is, $T_m = 0$.

Thus, $T = (n^2 I_m + I_h)\theta_h'' + (n^2 C_m + C_h)\theta_h'$ (17a)

$T = (n^2 I_m + I_h)\theta_m''/n + (n^2 C_m + C_h)\theta_m'/n$ (17b)

Here, as mentioned above, the counter voltage V of the electric motor 3 is represented by the following equation:

$V = K_e \cdot \theta_m'$

That is, $\theta_m' = V/K_e; \quad \theta_m'' = V'/K_e$ (18a)

Further, from the equation (14), $\theta_h' = V/(n \cdot K_e); \quad \theta_h'' = V'/(n \cdot K_e)$ (18b)

Here, $V' = dV/dt$.

Thus, the equations (17a) and (17b) can be represented by the following equation (19) from the equations (18a) and (18b).

$T = (n^2 I_m + I_h)V'/(n \cdot K_e) + (n^2 C_m + C_h)V/(n \cdot K_e)$ (19)

Therefore, from the equation (19), it is possible to obtain the steering torque T only by detecting the counter voltage V of the electric motor 3 as long as the electric motor 3 is not used as the reaction-force motor.

On the contrary, in the case that the electric motor 3 is used as the reaction-force motor, that is, $T_m \neq 0$, since it is evidently impossible to detect the counter voltage V, the steering torque T is obtained from an electric current i flowing to the electric motor 3 instead.

As mentioned above, since the torque $T_m$ actually generated by the electric motor 3 is given as follows:

$T_m = i \cdot K_t$ (10)

Substituting the equation (10) into the equations (16a) and (16b), $T = n(i \cdot K_t) + (n^2 I_m + I_h)\theta_h'' + (n^2 C_m + C_h)\theta_h'$ (20a)

$T = n(i \cdot K_t) + (n^2 I_m + I_h)\theta_m''/n + (n^2 C_m + C_h)\theta_m'/n$ (20b)

Therefore, even in the case that the electric motor 3 is used as the reaction-force motor, it is possible to obtain the steering torque T based on either one of the steering angle $\theta_h$ of the steering wheel 2 or the rotational angle $\theta_m$ of the electric motor 3, and the electric current i flowing to the electric motor 3.

Here, $\omega_h = \theta_h'; \quad \omega_h' = d\omega_h/dt = \theta_h''$ $\omega_m = \theta_m'; \quad \omega_m' = d\omega_m/dt = \theta_m''$ In this case, the equations (20a) and (20b) can be represented by the following equations (21a) and (21b).

$T = n(i \cdot K_t) + (n^2 I_m + I_h)\omega_h' + (n^2 C_m + C_h)\omega_h$ (21a)

$T = n(i \cdot K_t) + (n^2 I_m + I_h)\omega_m'/n + (n^2 C_m + C_h)\omega_m/n$ (21b)

Figure 2:
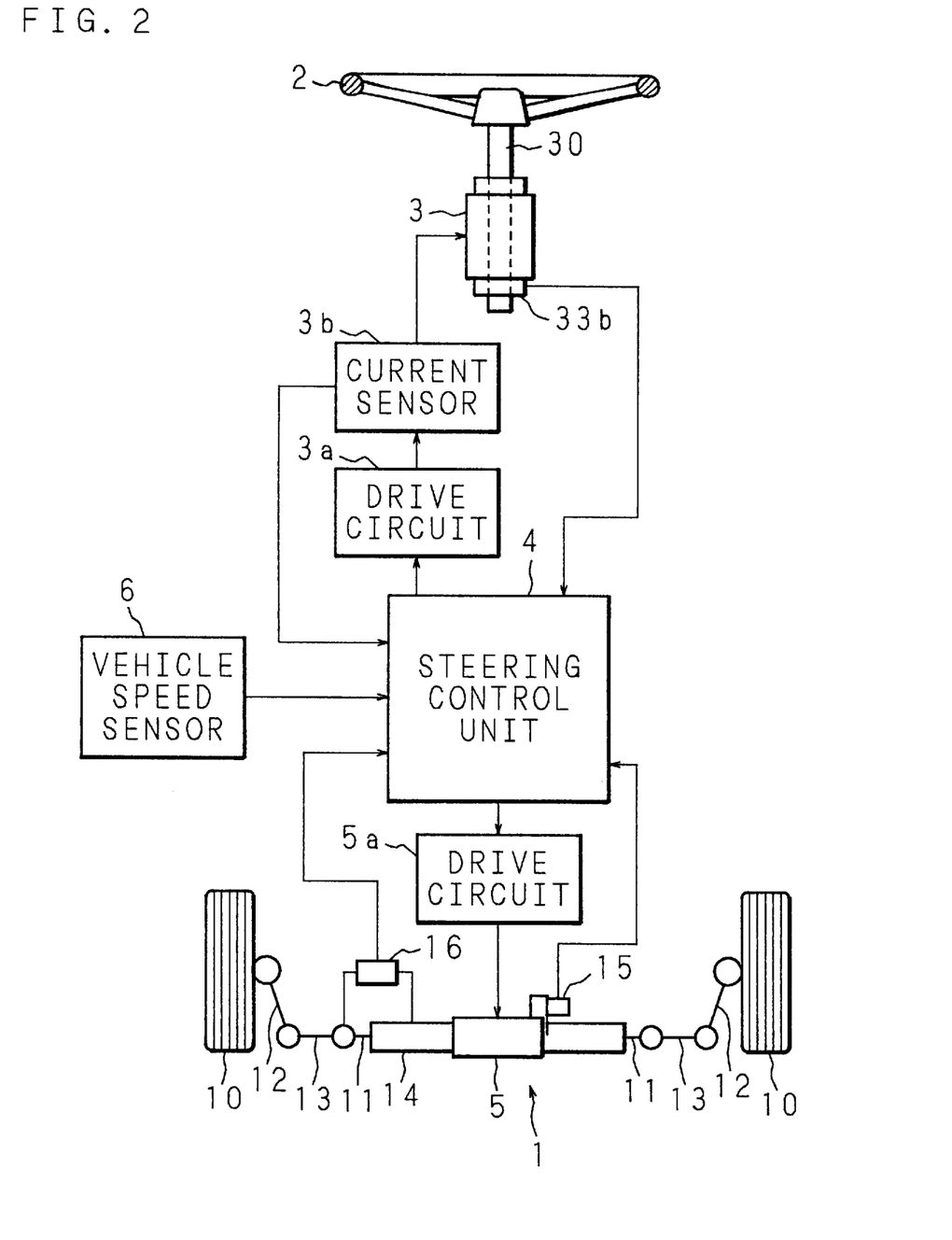
FIG. 2 is a block diagram showing an essential part of a configuration of a steering apparatus according to an embodiment of the present invention.

FIG. 2 is a block diagram showing an essential part of a configuration of a steering apparatus according to an embodiment of the present invention. In this steering apparatus, the embodiment employing the equation (21b) mentioned above is shown. This steering apparatus is provided with a steering mechanism 1 for directing a pair of tire wheels 10 which are arranged in both left and right sides of a vehicle's body (not shown), a steering wheel 2 serves as steering device which is arranged so as to be mechanically separated from the steering mechanism 1, an electric motor 3 which exerts a reaction force onto the steering wheel 2, and a steering control unit 4 composed of a micro processor. The steering apparatus is configured such that the steering control unit 4 drives a steering motor 5 arranged in the middle of the steering mechanism 1 in accordance with the operation of the steering wheel 2 so as to operate the steering mechanism 1.

In the steering mechanism 1, as known, both end portions of a steering shaft 11 which is extended in the left-and right direction of the vehicle's body and slides in the shaft direction and knuckle arms 12 which support the tire wheels 10 by independent tie rods 13 are connected together, to push or pull the knuckle arms 12 via the tie rods 13 due to a sliding motion of the steering shaft 11 in the both directions, and direct the tire wheels 10 to left or right. This directing operation is performed by converting the rotation of the steering motor 5 which is coaxially provided in the middle portion of the steering shaft 11 into the sliding operation of the steering shaft 11 by an appropriate motion converting mechanism.

The steering shaft 11 is restricted its rotation on the axis by a rotation restricting member (not shown) interposed between the steering shaft 11 and a housing 14. The rotation of the steering motor 5 is converted into the sliding motion of the steering shaft 11 in the axial direction, and thus the steering operation (the directing operation of the tire wheels 10) is performed in accordance with the rotation of the steering motor 5.

The angle of the tire wheels 10 is detected by a sensor 16 via a relative sliding position between the steering shaft housing 14 in one side of the steering motor 5 and the steering shaft 11. The output of the sensor 16 is given to the steering control unit 4 together with an output of a rotary encoder 15 which detects a rotational position of the steering motor 5.

The electric motor 3 which exerts the reaction force onto the steering wheel 2 is, for example, a three-phase brushless motor), and a casing thereof is mounted onto an appropriate portion of the vehicle's body (not shown) with respect to the rotational shaft 30. The steering wheel 2 is coaxially connected to a protruding end in one side of the rotational shaft 30.

The electric motor 3 is driven in the both directions by an electric current given from a drive circuit 3a in correspondence to a command signal given from the steering control unit 4, and exerts a force (a reaction force) to the steering wheel 2 in the opposite direction of operation thereof where the steering wheel 2 is mounted onto one end of the rotational shaft 30.

Therefore, as for the operation of the steering wheel 2, it is necessary to apply the steering torque opposing to the reaction force exerted by the electric motor 3. The steering torque applied to the steering wheel 2 in the manner mentioned above is calculated/detected by the steering control unit 4 based on the electric current which flows to the electric motor 3, and is used for adjusting the reaction force exerted by the electric motor 3.

The current sensor 3b detects the electric current applied to the electric motor 3 from the drive circuit 3a, and gives it to the steering control unit 4.

An amount of operation (steering angle) of the steering wheel 2 is detected by the rotary encoder 33 attached to the electric motor 3 with including the steering direction, and the detected result is given to the steering control unit 4. Further, a detected result of a vehicle speed sensor 6 which detects a traveling speed of the vehicle is given to the steering control unit 4.

An output of the steering control unit 4 is given to the electric motor 3 and steering motor 5 via respective drive circuits 3a and 5a, and the electric motor 3 and steering motor 5 are configured such as to perform respective operations in accordance with the command signal from the steering control unit 4.

The steering control unit 4 determines a reaction force to be applied to the steering wheel 2, performs a reaction-force control in which the command signal in outputted to the electric motor 3 so as to generate the reaction force, and calculates/detects the steering torque applied to the steering wheel 2 based on the rotational angle of the electric motor 3 detected by the rotary encoder 33b, the electric current of the electric motor 3 detected by the current sensor 3b, the moment of inertia of the steering wheel 2, and the moment of inertia of the electric motor 3, in the manner mentioned above.

Further, the steering control unit 4 recognizes the rotational angle including the rotational direction of the electric motor 3 in accordance with the input from the rotary encoder 33b, calculates a deviation of angle between the steering angle in accordance therewith and an actual angle recognized by the input from the sensor 16 attached to the steering mechanism 1, corrects the deviation so as to be increased or decreased in correspondence with a speed of the vehicle given as an input from the vehicle speed sensor 6 so as to calculate a target angle, and performs a steering control for driving the steering motor 5 until the target angle is obtained. At this time, the input from the rotary encoder 15 is used as a feed back signal for checking whether or not the steering motor 5 reached a desired position of rotation.

A description will be given below of an operation of the steering apparatus having the configuration mentioned above with reference to a flow chart in FIG. 3 showing the operation.

Figure 3:
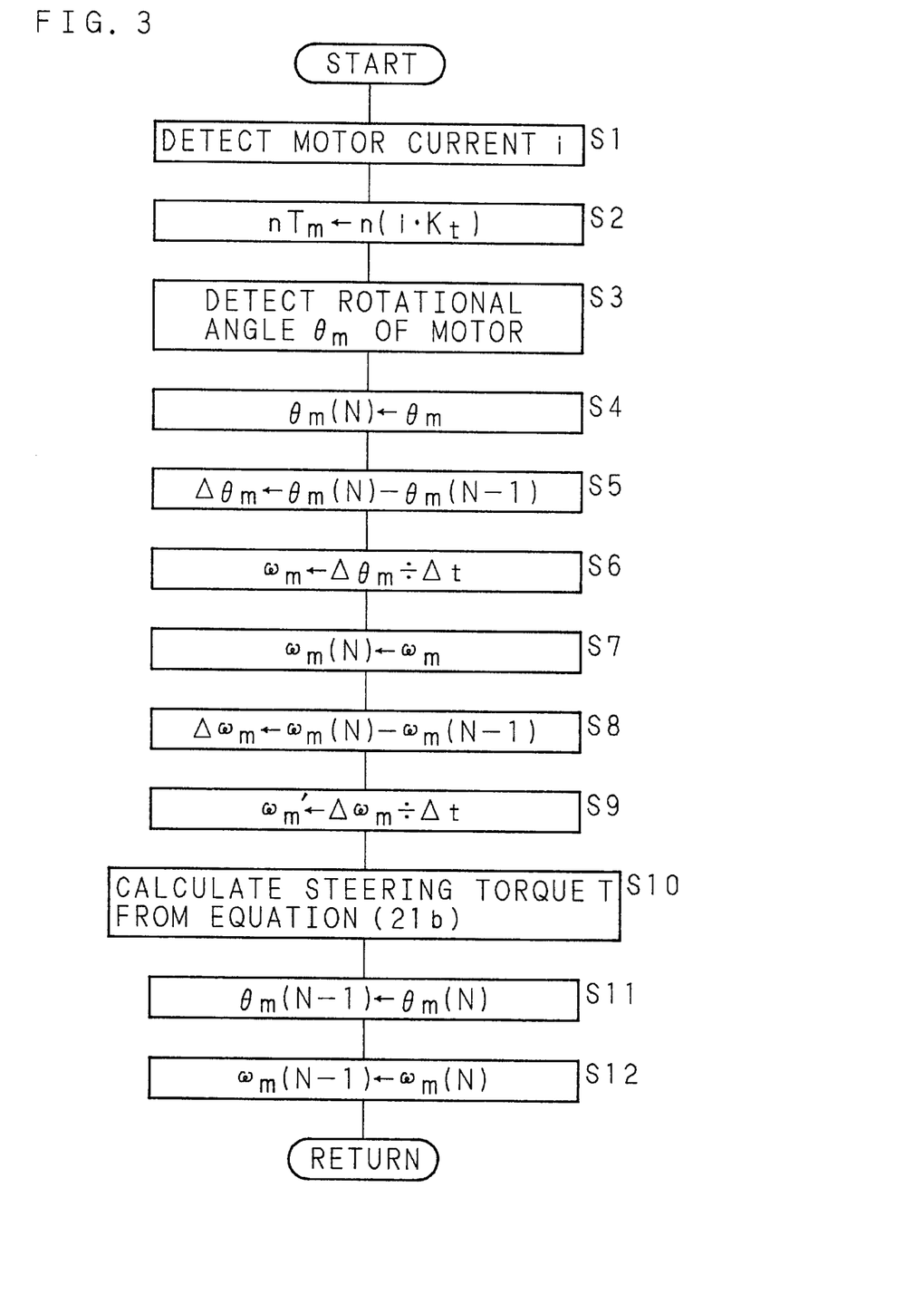
FIG. 3 is a flow chart showing an operation of a steering apparatus according to the embodiment of the present invention.

FIG. 3 is a flow chart showing an operation of an embodiment of a steering apparatus according to the present invention. First, the steering control unit 4 makes the current sensor 3b to detect an electric current i flowing to the electric motor 3 so as to read (S1), and calculates nTm in accordance with $n(i \cdot K_t)$ so as to store (S2).

Next, the steering control unit 4 makes the rotary encoder 33b to detect a rotational angle $\theta_m$ of the electric motor 3 so as to read (S3), and set an rotational angle $\theta_m(N)$ of the current sampling period so as to store (S4). Next, the steering control unit 4 calculates a difference between the rotational angle $\theta_m(N)$ of the current sampling period and the rotational angle $\theta_m(N-1)$ detected and stored in the preceding sampling period, and stores it as $\Delta\theta_m$ (S5). Further, the steering control unit 4 divides $\Delta\theta_m$ by a sampling period $\Delta t$ and determines a rotational speed $\omega_m$ of the electric motor 3 (S6).

Further, the determined rotational speed $\omega_m$ is stored as the rotational speed $\omega_m(N)$ of the current sampling period (S7). Next, the steering control unit 4 calculates a difference between the rotational speed $\omega_m(N)$ of the current sampling period and the rotational speed $\omega_m(N-1)$ detected and stored in the preceding sampling period, and stores as $\Delta\omega_m$ (S8). Then, the steering control unit 4 divides $\Delta\omega_m$ by the sampling period $\Delta t$ and determines a rotational acceleration $\omega_m'$ of the electric motor 3 so as to store (S9).

Next, the steering control unit 4 substitutes the stored $nT_m$, the rotational speed $\omega_m$ of the electric motor 3 and the rotational acceleration $\omega_m'$ of the electric motor 3 into the equation (21b), thereby calculating the steering torque T applied to the steering wheel 2 (S10).

Then, the steering control unit 4 stores the rotational angle $\theta_m(N)$ of the current sampling period as the rotational angle $\theta_m(N-1)$ of the preceding sampling period (S11), and stores the rotational speed $\omega_m(N)$ of the current sampling period as the rotational speed $\omega_m(N-1)$ of the preceding sampling period, thereby being returned.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A steering apparatus for vehicle, comprising:
    a steering mechanism for changing a direction of a tire wheel;
    an actuator for actuating said steering mechanism;
    a steering wheel mechanically unconnected to said steering mechanism;
    an electric motor connected to a rotational shaft of said steering wheel;
    a steering angle detector for detecting the steering angle of said steering wheel;
    a calculator for calculating a steering torque applied to said steering wheel based on the steering angle detected by said steering angle detector, a moment of inertia of said steering wheel, and a moment of inertia of said electric motor; and
    a controller for driving and controlling said actuator based on the steering torque calculated by said calculator.

2. The steering apparatus for vehicle according to claim 1, further comprising:
    a current detector for detecting an electric current flowing through said electric motor,
    wherein said calculator calculates the steering torque based on the electric current detected by said current detector, the steering angle detected by said steering angle detector, the moment of inertia of said steering wheel, and the moment of inertia of said electric motor.

3. The steering apparatus for vehicle according to claim 1, wherein said electric motor is a reaction-force motor for exerting force onto said steering wheel in a direction opposite to the steering direction of said steering wheel.

4. A steering apparatus for vehicle, comprising:
a steering mechanism for changing a direction of a tire wheel;
an actuator for actuating said steering mechanism;
a steering wheel mechanically unconnected to said steering mechanism;
an electric motor connected to a rotational shaft of said steering wheel;
a steering angle detector for detecting the steering angle of said steering wheel;
a calculator for calculating a steering torque applied to said steering wheel based on the steering angle detected by said steering angle detector, a moment of inertia of said steering wheel, and a moment of inertia of said electric motor; and
a controller for driving and controlling said actuator based on the steering torque calculated by said calculator,
wherein said calculator includes:
  a steering angular acceleration calculator for calculating a steering angular acceleration based on the steering angle;
  an adder for adding the moment of inertia of said steering wheel and the moment of inertia of said electric motor; and
  a multiplier for multiplying a calculated result of said steering angular acceleration calculator and an added result of said adder;
wherein said calculator calculates the steering torque based on a multiplied results of said multiplier.

5. The steering apparatus for vehicle according to claim 4, wherein said electric motor is a reaction-force motor for exerting a force onto said steering wheel in a direction opposite to the steering direction of said steering wheel.

6. A steering apparatus for vehicle, comprising:
a steering mechanism for changing a direction of a tire wheel;
an actuator for actuating said steering mechanism;
a steering wheel mechanically unconnected to said steering mechanism;
an electric motor connected to a rotational shaft of said steering wheel;
a steering angle detector for detecting the steering angle of said steering wheel;
a calculator for calculating a steering torque applied to said steering wheel based on the steering angle detected by said steering angle detector, a moment of inertia of said steering wheel, and a moment of inertia of said electric motor; and
a controller for driving and controlling said actuator based on the steering torque calculated by said calculator
a current detector for detecting an electric current flowing through said electric motor,
wherein said calculator calculates the steering torque based on the electric current detected by said current detector, the steering angle detected by said steering angle detector, the moment of inertia of said steering wheel, and the moment of inertia of said electric motor,
wherein said calculator includes:
  a steering angular acceleration calculator for calculating a steering angular acceleration based on the steering angle;
  a first adder for adding the moment of inertia of said steering wheel and the moment of inertia of said electric motor;
  a multiplier for multiplying a calculated result of said steering angular acceleration calculator and an added result of said first adder; and
  a second adder for adding a value based on the current and a multiplied result of said multiplier,
wherein said calculator calculates the steering torque based on an added result of said second adder.

7. A steering apparatus for vehicle, comprising:
a steering mechanism for changing a direction of a tire wheel;
an actuator for actuating said steering mechanism;
a steering wheel mechanically unconnected to said steering mechanism;
an electric motor connected to a rotational shaft of said steering wheel;
a steering angle detector for detecting the steering angle of said steering wheel;
a calculator for calculating a steering torque applied to said steering wheel based on the steering angle detected by said steering angle detector, a moment of inertia of said steering wheel, and a moment of inertia of said electric motor; and
a controller for driving and controlling said actuator based on the steering torque calculated by said calculator
a current detector for detecting an electric current flowing through said electric motor,
wherein said calculator calculates the steering torque based on the electric current detected by said current detector, the steering angle detected by said steering angle detector, the moment of inertia of said steering wheel, and the moment of inertia of said electric motor,
wherein said electric motor is a reaction-force motor for exerting a force onto said steering wheel in a direction opposite to the steering direction of said steering wheel.

8. A steering apparatus for vehicle, comprising:
a steering mechanism for changing a direction of a tire wheel;
an actuator for actuating said steering mechanism;
an steering wheel mechanically unconnected to said steering mechanism;
an electric motor connected to a rotational shaft of said steering wheel;
a rotational angle detector for detecting a rotational angle of said electric motor;
a calculator for calculating a steering torque applied to said steering wheel based on the rotational angle detected by said rotational angle detector, a moment of inertia of said steering wheel, and a moment of inertia of said electric motor; and
a controller for driving and controlling said actuator based on the steering torque calculated by said calculator.

9. A steering apparatus for vehicle, comprising:
a steering mechanism for changing a direction of a tire wheel;
an actuator for actuating said steering mechanism;
an steering wheel mechanically unconnected to said steering mechanism;
an electric motor connected to a rotational shaft of said steering wheel;
a rotational angle detector for detecting a rotational angle of said electric motor;
a calculator for calculating a steering torque applied to said steering wheel based on the rotational angle detected by said rotational angle detector, a moment of inertia of said steering wheel, and a moment of inertia of said electric motor; and a controller for driving and controlling said actuator based on the steering torque calculated by said calculator;

a current detector for detecting an electric current flowing through said electric motor, wherein said calculator calculates the steering torque based on the electric current detected by said current detector, the rotational angle detected by said rotational angle detector, the moment of inertia of said steering wheel, and the moment of inertia of said electric motor.

10. The steering apparatus for vehicle according to claim 9, wherein said calculator includes:

a rotational angular acceleration calculator for calculating a rotational angular acceleration based on the rotational angle;

a first adder for adding the moment of inertia of said steering wheel and the moment of inertia of said electric motor;

a multiplier for multiplying a calculated result of said rotational angular acceleration calculator and an added result of said first adder; and a second adder for adding a value based on the current and a multiplied result of said multiplier, wherein said calculator calculates the steering torque based on an added result of said second adder.

11. The steering apparatus for vehicle according to claim 9, wherein said electric motor is a reaction-force motor for exerting a force onto said steering wheel in a direction opposite to the steering direction of said steering wheel.

12. A steering apparatus for vehicle, comprising:

a steering mechanism for changing a direction of a tire wheel;

an actuator for actuating said steering mechanism;

an steering wheel mechanically unconnected to said steering mechanism;

an electric motor connected to a rotational shaft of said steering wheel;

a rotational angle detector for detecting a rotational angle of said electric motor;

a calculator for calculating a steering torque applied to said steering wheel based on the rotational angle detected by said rotational angle detector, a moment of inertia of said steering wheel, and a moment of inertia of said electric motor; and a controller for driving and controlling said actuator based on the steering torque calculated by said calculator;
wherein said calculator includes:
a steering angular acceleration calculator for calculating a rotational angular acceleration based on the rotational angle;
an adder for adding the moment of inertia of said steering wheel and the moment of inertia of said electric motor; and a multiplier for multiplying a calculated result of said rotational angular acceleration calculator and an added result of said adder;

wherein said calculator calculates said steering torque based on a multiplied result of said multiplier.

13. The steering apparatus for vehicle according to claim 12, wherein said electric motor is a reaction-force motor for exerting a force onto said steering wheel in a direction opposite to the steering direction of said steering wheel.

14. A steering apparatus for vehicle, comprising:

a steering mechanism for changing a direction of a tire wheel;

an actuator for actuating said steering mechanism;

an steering wheel mechanically unconnected to said steering mechanism;

an electric motor connected to a rotational shaft of said steering wheel;

a rotational angle detector for detecting a rotational angle of said electric motor;

a calculator for calculating a steering torque applied to said steering wheel based on the rotational angle detected by said rotational angle detector, a moment of inertia of said steering wheel, and a moment of inertia of said electric motor; and a controller for driving and controlling said actuator based on the steering torque calculated by said calculator;

wherein said electric motor is reaction-force motor for exerting a force onto said steering wheel in a direction opposite to the steering direction of said steering wheel.

15. A steering apparatus for vehicle, comprising:

a steering mechanism for changing a direction of a tire wheel;

an actuator for actuating said steering mechanism;

a steering wheel mechanically unconnected to said steering mechanism;

an electric motor connected to a rotational shaft of said steering wheel;

a counter voltage detector for detecting a counter voltage of said electric motor;

a calculator for calculating a steering torque applied to said steering wheel based on the counter voltage detected by said counter voltage detector, a moment of inertia of said steering wheel, and a moment of inertia of said electric motor; and a controller for driving and controlling said actuator based on the steering torque calculated by said calculator.

16. The steering apparatus for vehicle according to claim 15, wherein said calculator includes:

an adder for adding the moment of inertia of said steering wheel and the moment of inertia of said electric motor; and a multiplier for multiplying said counter voltage and an added result of said adder;

wherein said calculator calculates the steering torque based on a multiplied result of said multiplier.

* * * * *